US012659347B2

(12) United States Patent
Tamir et al.

(10) Patent No.: US 12,659,347 B2
(45) Date of Patent: Jun. 16, 2026

(54) TECHNIQUES FOR PROTECTING WEB-BROWSERS AGAINST CROSS-SITE SCRIPTING EXPLOITATION ATTACKS

(71) Applicant: Radware Ltd., Tel Aviv (IL)

(72) Inventors: Alon Tamir, Kiryat Ono (IL); Amir Marmor, Arugot (IL); David Aviv, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 257 days.

(21) Appl. No.: 18/148,087

(22) Filed: Dec. 29, 2022

(65) Prior Publication Data

US 2023/0216885 A1 Jul. 6, 2023

Related U.S. Application Data

(60) Provisional application No. 63/295,036, filed on Dec. 30, 2021.

(51) Int. Cl.
*G06F 21/00* (2013.01)
*H04L 9/40* (2022.01)

(52) U.S. Cl.
CPC ...... *H04L 63/1466* (2013.01); *H04L 63/1425* (2013.01)

(58) Field of Classification Search
CPC ............. H04L 63/1466; H04L 63/1425; H04L 63/101; H04L 63/1416; H04L 63/168
See application file for complete search history.

(56) References Cited

U.S. PATENT DOCUMENTS

| | | | | |
|---|---|---|---|---|
| 11,178,150 B1* | 11/2021 | Lie | ........................ | H04L 63/101 |
| 2004/0260754 A1* | 12/2004 | Olson | ................... | H04L 63/162 709/200 |
| 2005/0144297 A1* | 6/2005 | Dahlstrom | ............ | H04L 63/101 709/229 |
| 2015/0319189 A1* | 11/2015 | Maher | ..................... | H04L 67/02 726/22 |
| 2016/0080345 A1* | 3/2016 | Safruti | ................... | H04L 67/02 726/6 |
| 2016/0323309 A1* | 11/2016 | Sethi | ................... | H04L 63/1466 |
| 2017/0149803 A1* | 5/2017 | Lo | ........................ | H04L 63/123 |
| 2017/0353434 A1* | 12/2017 | Al-Saber | .............. | H04L 63/168 |
| 2018/0091547 A1* | 3/2018 | St. Pierre | ............ | H04L 63/1458 |
| 2018/0198807 A1* | 7/2018 | Johns | ................. | H04L 63/1425 |
| 2019/0347407 A1* | 11/2019 | Beskrovny | ........... | G06F 21/566 |
| 2022/0272127 A1* | 8/2022 | Yawalkar | ............ | H04L 63/1433 |

* cited by examiner

*Primary Examiner* — Michael M Lee
(74) *Attorney, Agent, or Firm* — M&B IP Analysts, LLC

(57) ABSTRACT

A method and system for detecting client-side cross-site scripting exploitation attacks according to an embodiment are disclosed. The method includes downloading an access list from a remote server; capturing a request to access an external resource, wherein the request is initiated by a script executed over the web browser, wherein the external web resource is external to the web browser executed on a client device; determining, based on the access list, if the requested external web resource can be accessed; and applying a mitigation action on the request to access the external web resource when it is determined that the external web resource cannot be accessed.

18 Claims, 7 Drawing Sheets

TECHNIQUES FOR PROTECTING WEB-BROWSERS AGAINST CROSS-SITE SCRIPTING EXPLOITATION ATTACKS

CROSS-REFERENCE TO RELATED APPLICATIONS

The present application claims the benefit of U.S. Provisional Patent Application No. 63/295,036 filed on Dec. 30, 2021. The contents of which are incorporated herein by reference.

TECHNICAL FIELD

This disclosure generally relates to network security technology, and more particularly to client-side protection.

BACKGROUND

Hackers try different techniques to steal personal information from individuals. Personal information is defined as either personally identifiable information, or sensitive personal information, as used in information security and privacy laws, or is information that can be used on its own or with other information to identify, contact, or locate a single person, or to identify an individual in context. Examples of personal information include social security numbers, credit card information, and so on.

Some hacking techniques include attacking servers, databases, and the like that store or otherwise process such information. Other attacks target user (client) devices to steal personal information at the source. A recent client targeted attack is known as "Megacart," which is a type of zero-day exploitation attack.

Client-side attacks (or browser's threats), such as Megacart, operate by gaining access to websites either directly or via third-party services and injecting malicious JavaScript that steals data that shoppers enter into online payment forms, typically on checkout pages. Such attack operatives either breach sites directly or via supply chain attacks. Supply chain attacks target third-party servers that supply code to websites. Thus, when a third-party server is compromised, a hacker can effectively breach thousands of sites at once.

FIG. 7 is a schematic diagram illustrating the operatives of client-side cross-site scripting exploitation attacks. The entities depicted in FIG. 7 includes a browser 701 executed by a client device 710, a third-party server 720, a web server 730 hosting a website accessed by the browser, and a hacker server 740 managed by a hacker.

To execute a cross-site scripting exploitation attack, such as the Megacart attack, the hacker 101 injects a script 721 to a webpage of a website. The script 721 includes a piece of malicious code that is being executed by the browser 701 when rendering or processing a webpage. For example, the third-party server 720 may include JavaScript® that when processed by the browser 701 calls an external payment service, such JavaScript® code can be manipulated by the hacker to include a form-jacking script that would push information from the browser 701 to the hacker server 740.

When a user of the device 710 accesses a website hosted by the third-party server 720, a web page is returned to the browser 701. The web page includes the modified script retrieved from the third-party server 720, thus such when interpreted or processed by the browser would capture personal or sensitive information and send information to the hacker server 740. For example, in Megacart, the modified script extracts information (such as login credentials and credit card information) from a shopping cart.

The domain name of the hacker server 740 is different than the web server 730. Further, the third-party server 720 is not hosted by the web server 730. The third-party code from the third-party server 720 is integrated with thousands of websites, so when one service is compromised, thousands of websites become vulnerable at once.

Current solutions, such as anti-virus or anti-malware, are designed to protect the client devices, but cannot protect from information leakage of such devices. Further, anti-virus or anti-malware solutions are not zero-day. That is, such solutions first learn signatures of the virus or malware, and then block malicious activity based on the learned signatures. Solutions for protecting the web servers are not practical in such types of attacks, as the malicious code is implemented from a third-party resource and attacks the user's devices without any prior knowledge of the malicious code.

Therefore, it would be advantageous to provide an efficient solution for protecting web-browsers against cross-site scripting exploitation attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting client-side cross-site scripting exploitation attacks according to an embodiment. The method includes downloading an access list from a remote server; capturing a request to access an external resource, wherein the request is initiated by a script executed over the web browser, wherein the external web resource is external to the web browser executed on a client device; determining, based on the access list, if the requested external web resource can be accessed; and applying a mitigation action on the request to access the external web resource when it is determined that the external web resource cannot be accessed.

Certain embodiments disclosed herein include a system for detecting client-side cross-site scripting exploitation attacks according to an embodiment. The system includes a processing circuitry; and a memory, the memory containing instructions that, when executed by the processing circuitry, configure the system to: download an access list from a remote server; capture a request to access an external resource, wherein the request is initiated by a script executed over the web browser, wherein the external web resource is external to the web browser executed on a client device; determine, based on the access list, if the requested external web resource can be accessed; and apply a mitigation action on the request to access the external web resource when it is determined that the external web resource cannot be accessed.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
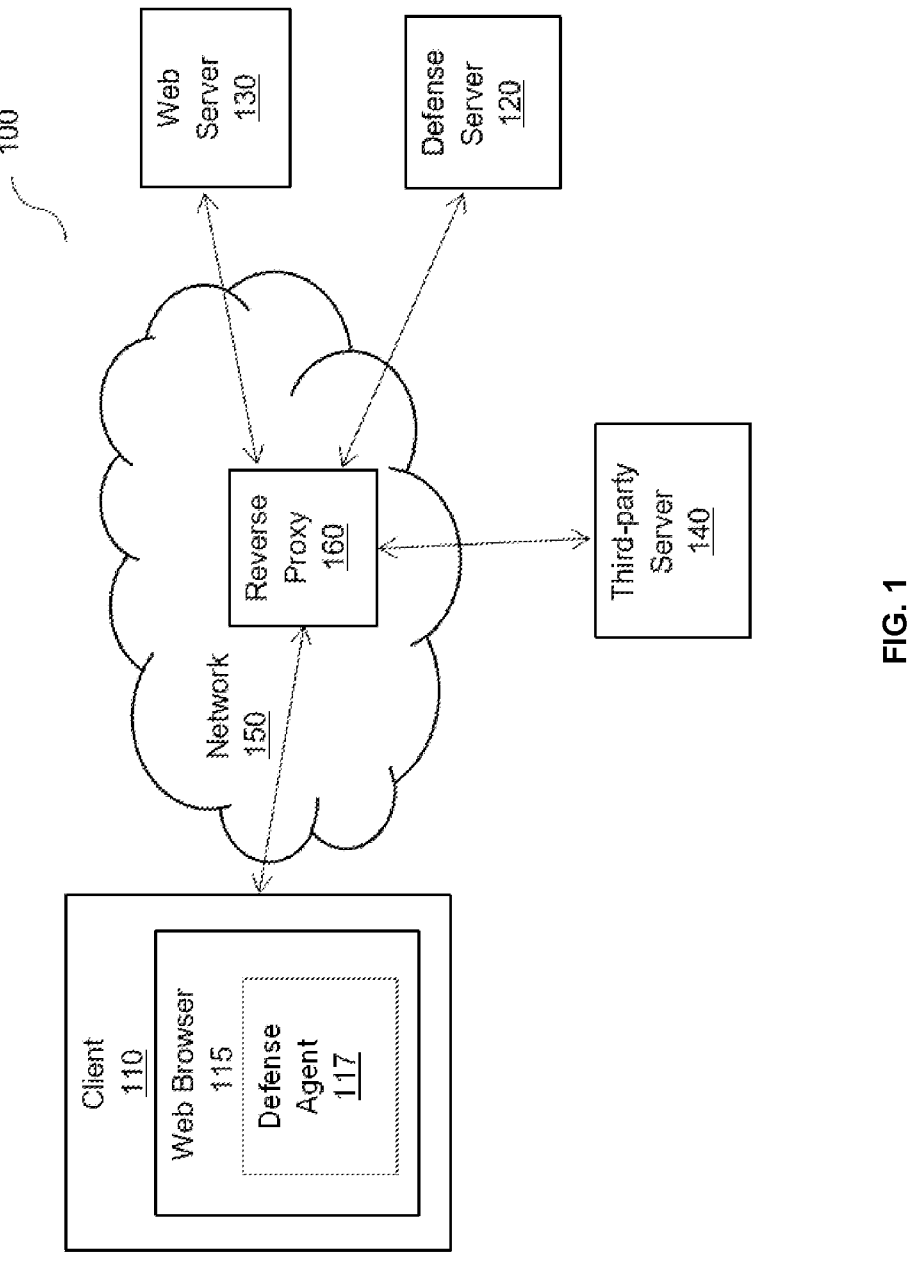
FIG. 1 is a network diagram utilized to describe the various disclosed embodiments for protecting against cross-site scripting exploitation attacks.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, techniques for protecting web browsers against cross-site scripting exploitation attacks are disclosed. In an embodiment, the solution is based on an agent installed on a webpage and utilized to defend against such attacks. The defense is achieved, in part, by communicating with a backend server configured to instructions to the agent. The disclosed embodiments allow to detect and block attacks, such as, but not limited to, Megacart attacks, and prevent user information from being revealed. Thus, the disclosed techniques improve the security of users, users' information, and can also prevent identity theft.

FIG. 1 shows an example network diagram 100 utilized to describe the various disclosed embodiments for protecting against cross-site scripting exploitation attacks. Here, the web browser of the user device, and hence the user, are protected against stealing the user's data, identity, or other information considered personal or confidential.

The network diagram 100 illustrated in FIG. 1 includes a client device (or simply client) 110, a defense server 120, a web server 130, and a third-party server 140 all connected to the network 150. In the deployment shown in FIG. 1, a reverse proxy 160 is connected in the network 150 and configured to proxy communication between the client 110 and the servers 120 and 130. The third-party server 140 may include a code repository or library.

The client 110 may be a PC, a mobile phone, a smart phone, a tablet computer, a server, or any computing device, and the like. The client 110 is operated by a legitimate user or a legitimate program. In one configuration, the client 110 is configured to execute a web browser 115. The web browser (or simply browser) 115 may include any software application to access the content stored or accessible through the web server 130. For example, the web server 130 may host a website for the web browser 115 to render and display webpages of that website.

The web server 130 may include a web server, a streaming server, a database server, or any other type of servers that provide content or information to the client 110. The web server 130 may utilize the third-party server 140 to serve the client 110. The third-party server 140 may include a code repository that provides a piece of code that is processed when downloading pages of the website (hosted by the server 130). The piece of code may include a script code, such as a JavaScript.

The reverse proxy 160 is a device that retrieves resources on behalf of the client 110 from the defense server 120 or web server 130. Such resources are then returned to the client 110, appearing as if they originated from the reverse proxy 160. In an example embodiment, the reverse proxy 160 is configured to ensure that a defense agent (117) is the first piece of code being executed when a webpage is downloaded to the web browser 115.

Figure 2:
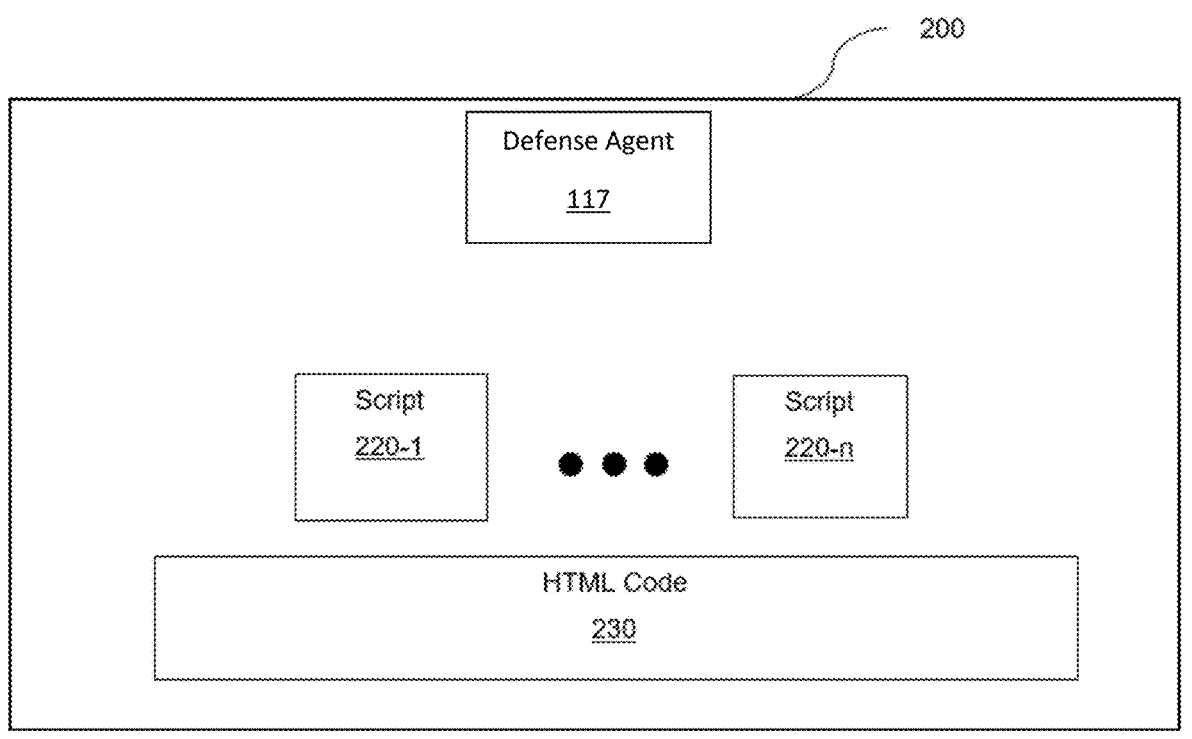
FIG. 2 is an example structure of a web page utilized to demonstrate the operation of the disclosed embodiments.

According to the disclosed embodiment, the defense agent 117 is configured to detect and mitigate cross-site scripting exploitation attacks. To this end, the defense agent 117 is configured to inspect actions performed by other scripts executed on the web page. This is further illustrated in FIG. 2 where an example webpage 200 is shown.

The webpage 200 may be an HTML page that includes one or more scripts 220-1 through 220-$n$, in addition to the defense agent 117. The webpage 200 may include HTML code 230. The defense agent 117, in an embodiment, is also a script. The defense agent 117 is called and executed first on the webpage 200. To this end, the webpage may include a code line calling for the defense agent 117. For example, the code line may include:

```
<link   href="css/defense-agent.css"   rel="stylesheet"
    type="text/css">
```

To this end, the webpage 200 may be programmed by the website's developer to first call the defense agent 117. In an embodiment, the reverse proxy 160 is configured to capture a response (web page) from the web server 130 and rewrite the webpage 200 to first call for the defense agent 117.

The defense agent 117, when executed, is configured to intercept any outgoing request from any of the scripts 220 or the HTML code 230 in the webpage 200. The intercepted request is for any URL resource (e.g., image, another web page, a script code, etc.) The request can be issued by fetching, XMLHttpRequest, by an HTML resource URL, and the like. The interception of requests can be performed using JavaScript application programming interface (API) modification or a Service Worker. These techniques are discussed below.

In an embodiment, the defense agent 117, when executed, is further configured to determine if the requested URL is in a whitelist. If so, the request is approved; otherwise, the request is blocked. The whitelist may be configured with the defense agent 117 and may be determined by the defense server 120. The defense agent 117 may communicate with the defense server 120 to retrieve the most recent whitelist for the webpage 200. By whitelisting URLs, any access to malicious servers (e.g., a hacker server) are blocked, as the URLs of such servers would not be listed.

As an example, the script 220-1 executes a cross-site exploitation script to collect user information and send such information to the server at a domain not included in the whitelist, thus any attempt to access the server would be blocked. It should be noted that a typical web page includes tens of different URLs of different domains or sub-domains of the web server 130 hosting the web page.

In another embodiment, the defense agent 117 is config-ured to monitor actions performed by any of the scripts 220 and determine if such actions are attempts to exploit user's information. For example, accessing certain form fields in a webpage, accessing a domain that is not frequently called, and so on.

In an embodiment, the defense agent 117 is configured to harden all the scripts 220-1 to 220-*n* to intercept requests by modifying APIs of scripts. Typically, the scripts 220-1 through 220-*n* are JavaScript® and the modification is JavaScript API modification.

The JavaScript API modification includes hardening the JavaScript base API calls so that any API call from a script 220 (e.g., script 220-2) would be directed through the defense agent 117. For example, the defense agent 117 is configured to change the windows.fetch API to a guarded implementation, causing any fetch call to go through the defense agent 117. Other API that are hardened in a similar fashion includes Fetch, XMLHttpRequest, Image, Form Submit, Frame, an element 'src,' attribute, an element 'href' attribute, and so on.

In an embodiment, hardening of scripts 220-1 to 220-*n* is performed by implementing and executing at least one service worker. A service worker is a method that enables applications to take advantage of persistent background processing, including hooks, to enable bootstrapping of web applications while offline. Further, service workers allow for cross browser features, allowing handling requests, modi-fying responses, and handling cache. Service workers are currently supported by modern web browsers, such as Inter-net Explorer® 11, Firefox®, Chrome®, and so on.

In one configuration, the defense agent 117, when executed, is configured to load a service worker from the main root of the website, so to handle any site request. The loaded service worker can capture any request sent from the web browser's tab, rendering the webpage 200. It should be noted that as the service worker is executed by the browser, all requests from any script 220, regardless of the hacker JavaScript API usage, can be captured. The requests cap-tured by a service worker are transferred to the defense agent 117 to determine if the request is directed to a URL designated in the whitelist. Only whitelist requests are allowed.

It should be noted that the defense agent 117 is a piece of software code executed over the client (110, FIG. 1). A script is a high-level, often just-in-time compiled, software code. The software shall be construed broadly to include any type of instructions. Instructions may include code (e.g., in source code format, binary code format, executable code format, or any other suitable format of code). The instruc-tions, when executed, cause the processing circuitry (e.g., embedded in the client device) to perform the various functions or processes of the defense agent 117.

Figure 3:
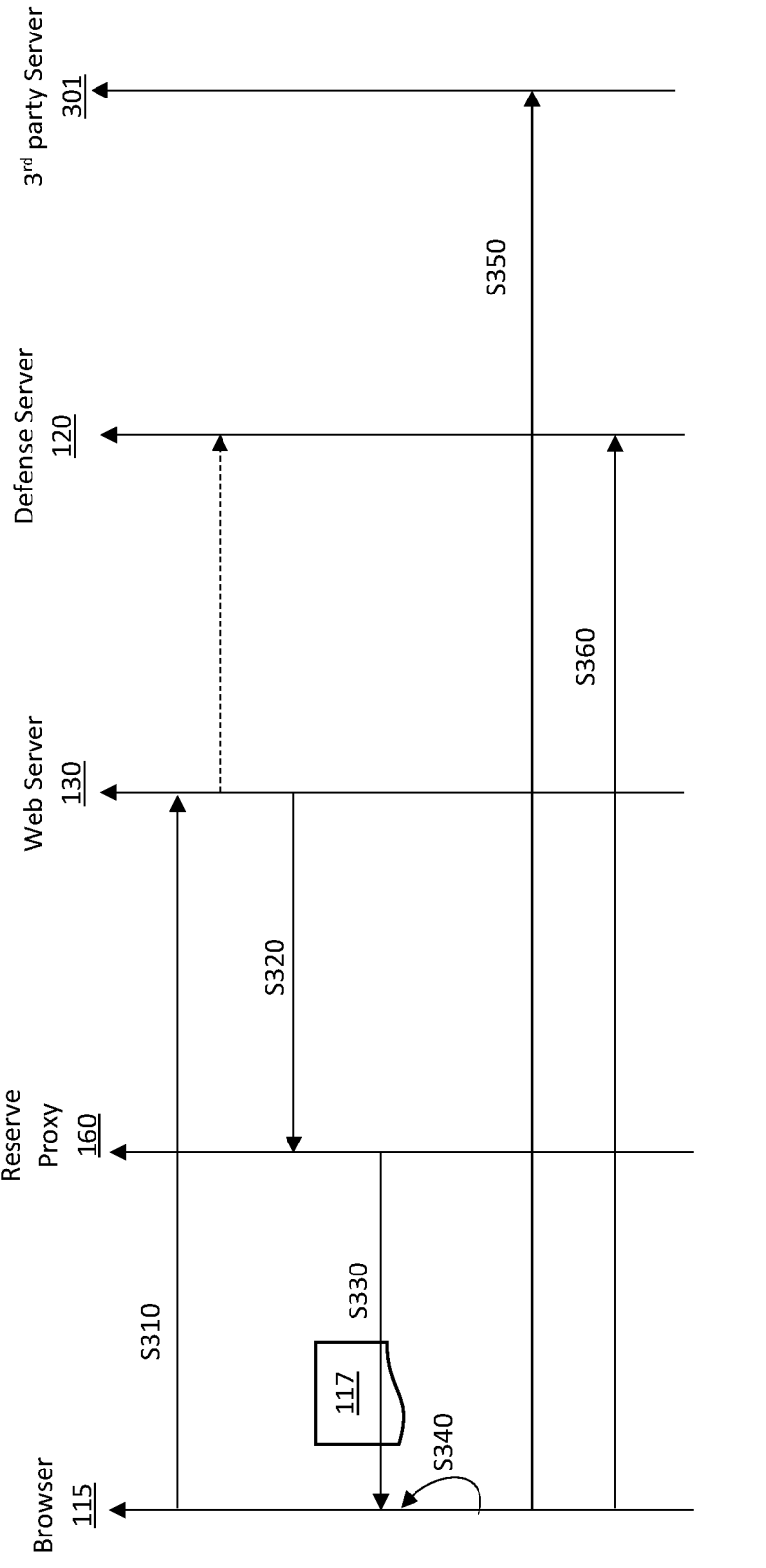
FIG. 3 is a flow sequence diagram illustrating the interactions between the elements in FIG. 1 when blocking browser cross-site exploitation attacks.

FIG. 3 is an example flow diagram 300 illustrating the interactions between the elements in FIG. 1 when there are blocking browser cross-site exploitation attacks. The web browser 115, defense server 120, web server 130, third-party server 140, and reverse proxy 160 are discussed in detail above.

At S310, the browser 115 sends a request to access a website hosted on the web server 130. The request is passed through the reverse proxy 160.

At S320, a response returned to the browser 115 is captured by the reverse proxy 160. The response is an HTML page of the website.

At S330, the reverse proxy 160 injects the defense agent 117 to the response (web page) as the first script to be executed by the browser 115. The defense agent 117 is configured with an initial whitelist. The modified response (with the defense agent) is replayed to the browser 115.

At S340, the defense agent 117, when executed over the browser 115 is configured to request and receive an updated whitelist from the defense server 120. The proxy 160 passes a communication between the web browser 115 and defense server 120.

At S350, any request, and specifically cross-site requests, are captured by the defense agent 117. A cross-site request is a request that is directed to a website that is not hosted by defense server 120. In the example shown in FIG. 2, the server 130 is a third-party server accessed through a domain name designated in the whitelist. If the request is directed to a domain in the whitelist, the request, at S360, is sent to the destination, e.g., server 130 in FIG. 3. Otherwise, the request is blocked (S365, not shown).

At S360, all captured requests (allowed or blocked) are gathered and sent to the defense server 120. Alternatively or collectively, the metadata on each captured script may be generated and sent to the server 120. Such metadata may include a script name generated by the request, the requested destination (e.g., URL), time and date of the request, status of the request (allowed or blocked), and so on.

The defense server 120 is configured to process the received requests and/or the respective metadata to deter-mine if the whitelist can be updated. The defense server 120 can determine if a requested URL should be added to a blacklist based on information received from reputation services. In an embodiment, blacklisting a URL by cross-correlating a request with requests from different web browsers accessing different web servers.

Figure 4:
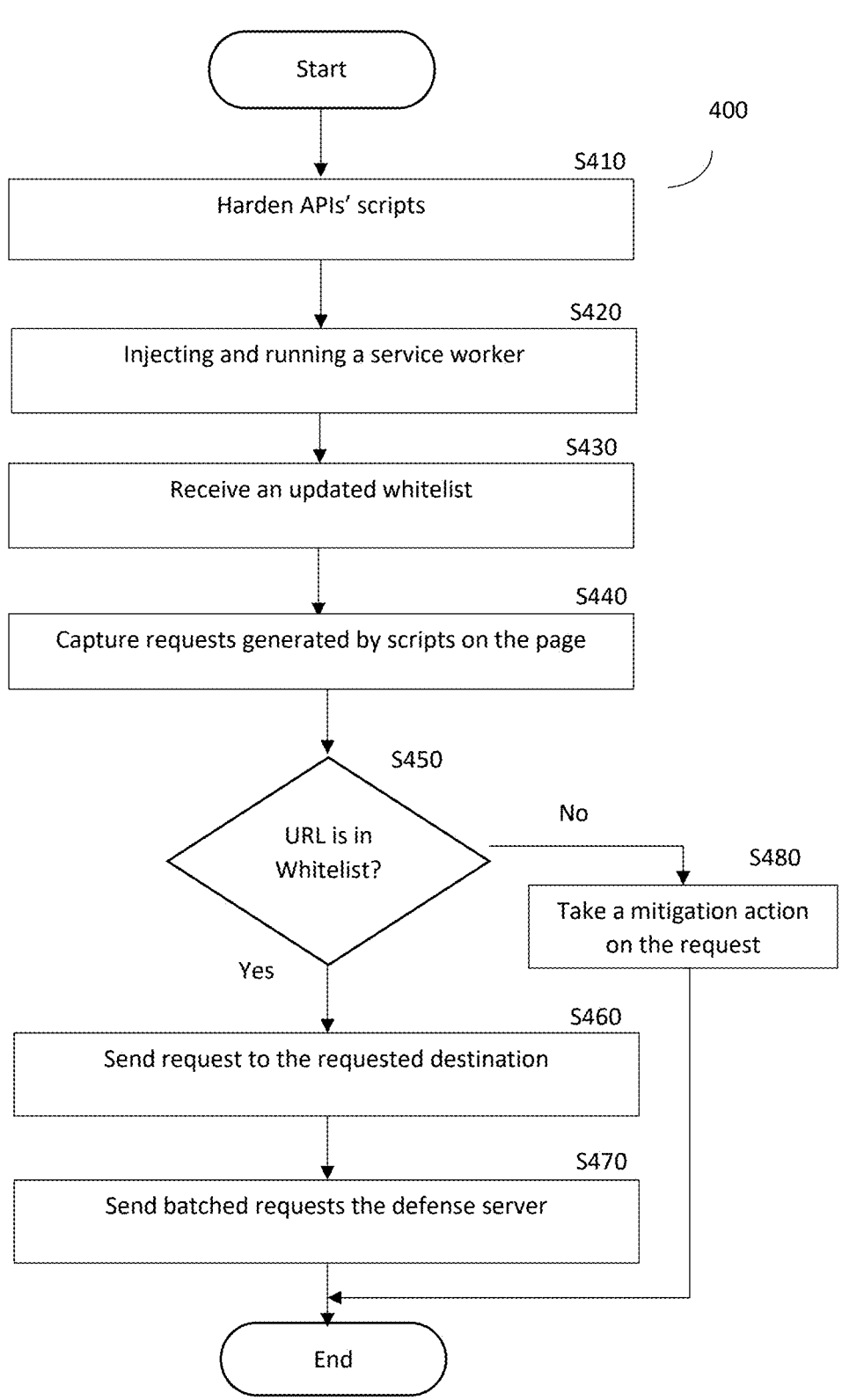
FIG. 4 is a flowchart illustrating the operation of the defense agent for detecting and mitigating client-side cross-site scripting exploitation attacks according to an embodiment.

FIG. 4 is an example flowchart 400 illustrating a method for detecting and mitigating client-side cross-site scripting exploitation attacks according to an embodiment.

The method may be performed by a defense agent being executed by the browser as the web page embedding the request is uploaded. As the defense agent is the first in the webpage, this script would be the first script to be executed. It should be noted that the defense agent, and hence the browser, are being executed over a client device. As noted above, such a device may include any computing device including a processor and memory.

The defense agent is injected into the browser (e.g., browser 115) in response to a request to access a web source (e.g., website, webpage, a service) hosted on the web server. Such a request is passed through the reverse proxy. The response returned to the browser is captured by the reverse proxy, which injects the defense agent to the response (web page) as the first script (or piece of code) to be executed by the browser.

At S410, script's APIs of each script (other than the defense agent) in the webpage are modified to harden their functionality. As noted above, this is performed to capture API calls by the defense agent. In an embodiment, the scripts are JavaScript® and at least the following APIs are modified: Fetch, XMLHttpRequest, Image, Form Submit, Frame, element 'src' attributes, and element href attributes.

Collectivity or alternatively to S410, at S420, a service worker is injected for execution by the browser. The injected Service Worker is configured to capture all requests from the browser (or a browser tab) and transfer the captured requests to the defense agent.

At S430, a request is sent to the defense server to receive an updated access list. In an embodiment, the access list is a whitelist. The whitelist is specific for the protected website hosted on the protected web server, being accessed by the browser executing the defense agent. In an embodiment, the defense agent is configured with an initial whitelist based on the website being accessed. The initial whitelist can be updated by the defense server. In another embodiment, the access list may include a blacklist, i.e., a list of vulnerable web resources.

At S440, a request to access a resource generated by any script in the web page is being captured. The request may include uploading content or resources to the web page. For example, a request may be to a repost download images, advertisements (ads), video streams, and the like. As another embodiment, the request may be for analytics services. The resource accessed by the script may be external to the webpage. That is, the resource may be downloaded from a server may or may not host the web server. The requests generated by the resources may be in a form of API calls, generated by the script.

At S450, the URL or domain name in the captured request is compared to the whitelist. If the URL is in the whitelist, at S460, the request is sent to the requested destination. Otherwise, at S480, the mitigation action is performed on the request. The mitigation action may include blocking the request, reporting on a malicious activity, displaying an alert on the browser, and so on. The mitigation action may include any combination of the above.

Then, at S470, the captured request is sent to the defense server. In an embodiment, a number of captured requested or their respective metadata are collected and sent as a batch.

Figure 5:
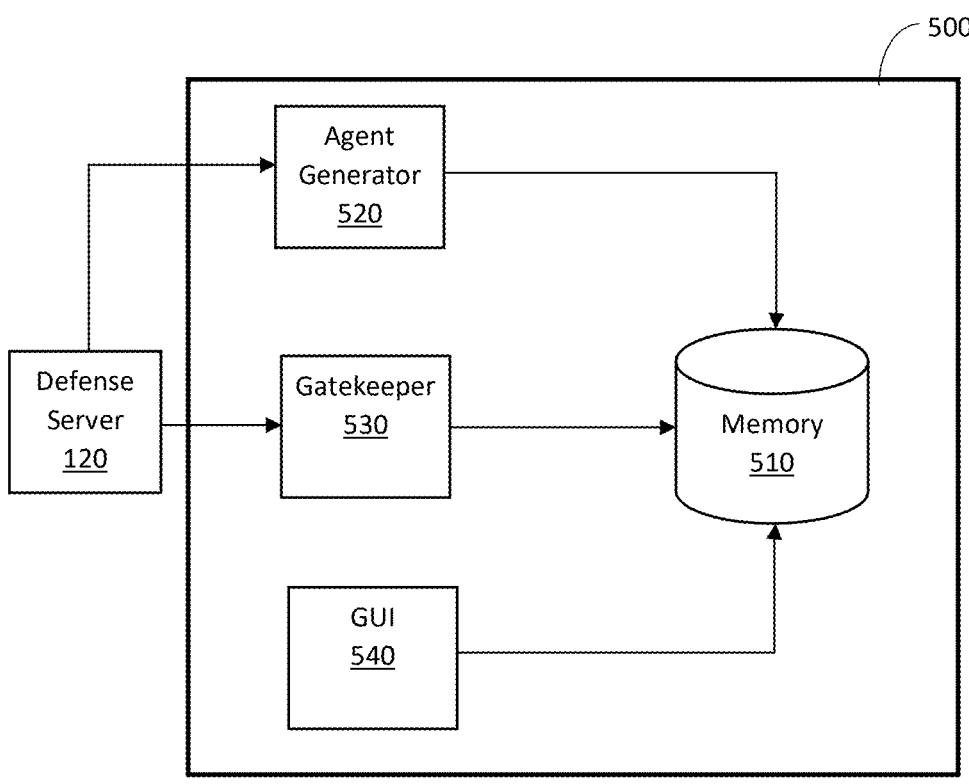
FIG. 5 is a schematic diagram illustrating the logical component of the defense server according to an embodiment.

FIG. 5 is an example diagram 500 illustrating logical component of the defense server 120 according to an embodiment. The embodiment includes an in-memory data structure 510, an agent generator 520, a gatekeeper 530, and a graphical user interface (GUI) 540.

The in-memory data structure 510 is a persistent memory for both configuration and detection. In an embodiment, the data structure 510 can be realized as a REDIS is a cluster REDIS deployment and is automatically scaled by a proprietary micro service in case of high load. The load is a factor of the CPU average on all of the REDIS pods. By default, the REDIS cluster starts with 6 pods.

The agent generator 520 is configured to provide the scripts (e.g., JavaScript) to be injected into the main site's HTML. That is, the agent generator 520 is responsible for generating the defense agent 117. The generated defense agent 117 includes two elements a JavaScript® API modification and a service worker to modify or capture the calls or requests generated by other scripts running on the page.

The gatekeeper 530 is used for API calls and as an auth request by the reverse proxy. The gatekeeper 530 is configured to provide several APIs including, for example: '/auth' (a request URL be injected by a script and/or CSP header in the response); '/getpolicy' (received the latest version of the whitelist); '/getscript' (get a service worker to be called from the root of the main site); and '/report' (gets the detection reports from the agents).

The GUI 540 is a management system that allows to configure the defense server 120. In an embodiment, the defense server 120 supports a multi-tenant architecture, where each tenant servers a different website. The multi-tenant architecture allows independent configuration per tenant. For example, the following can be set per tenant: a list of regular expressions of the protected URLs; a list of webpages, per site, to inject the defense agent; enable/disable page protection; a mitigation policy per website or webpage; enable/disable the defense agent operation, and so on. In an embodiment, the configuration of the defense server 120 is enabled via the GUI of the defense server 120.

The mitigation action that can be defined for the defense agent 117 (via the server 120) may include reporting a malicious URL or domain (a domain of a hacker server), blocking access to a URL or domain, and the like. Blocking a URL can be performed using a content-security-protection (CSP) method. The CSP method allows to block requests using a special header in the response. The blocking may also include not sending requests to malicious URLs. In an embodiment, a mitigation policy can be defined per URL (known or previously discovered).

In an embodiment, the defense agent 117 can be configured to specifically handle iFrames within a webpage. An iFrame protection is required as a hacker can use the hacked 3rd-party to create a remote frame to his selected site and use postMessage to communicate between the main site page and the iFrame. To prevent that defense can either block iFrames (requested by a $3^{rd}$ party server 301) or a proxy such frames. Blocking iFrames includes preventing the creation of an iFrame in the protected website. Proxying of iFrames includes converting an iFrame into a local domain frame and injecting the defense agent into the local domain frame. The defense agent can block any request when injected into the local domain frame. Further, the local frame when executing the defense agent can now access the reverse proxy. The reverse proxy 160 would proxy requests generated by the scripts in the page and the converted frame requests. In an embodiment, the service worker, initiated by the defense agent, is configured to replace any request from the converted frame to have a specific prefix, hence allowing special handling to be executed in the reverse proxy. It should be noted that the elements of the defense server 120 can be implemented in hardware as demonstrated in FIG. 6.

Figure 6:
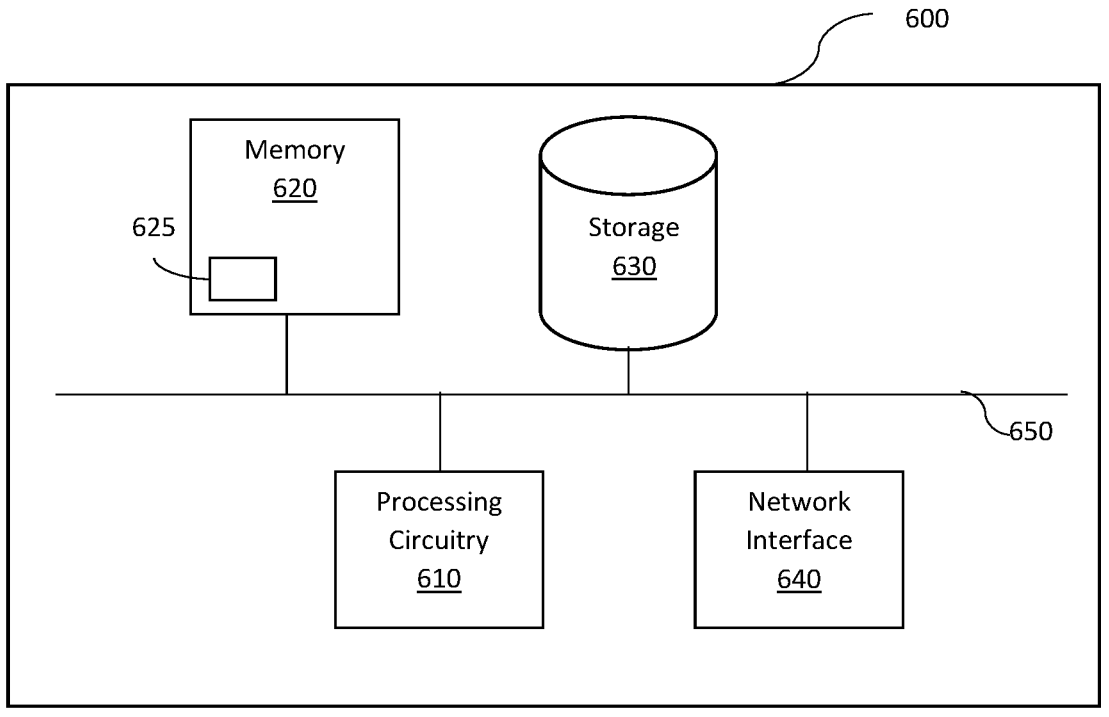
FIG. 6 is a block diagram of a hardware architecture of a defense server according to an embodiment.
Figure 7:
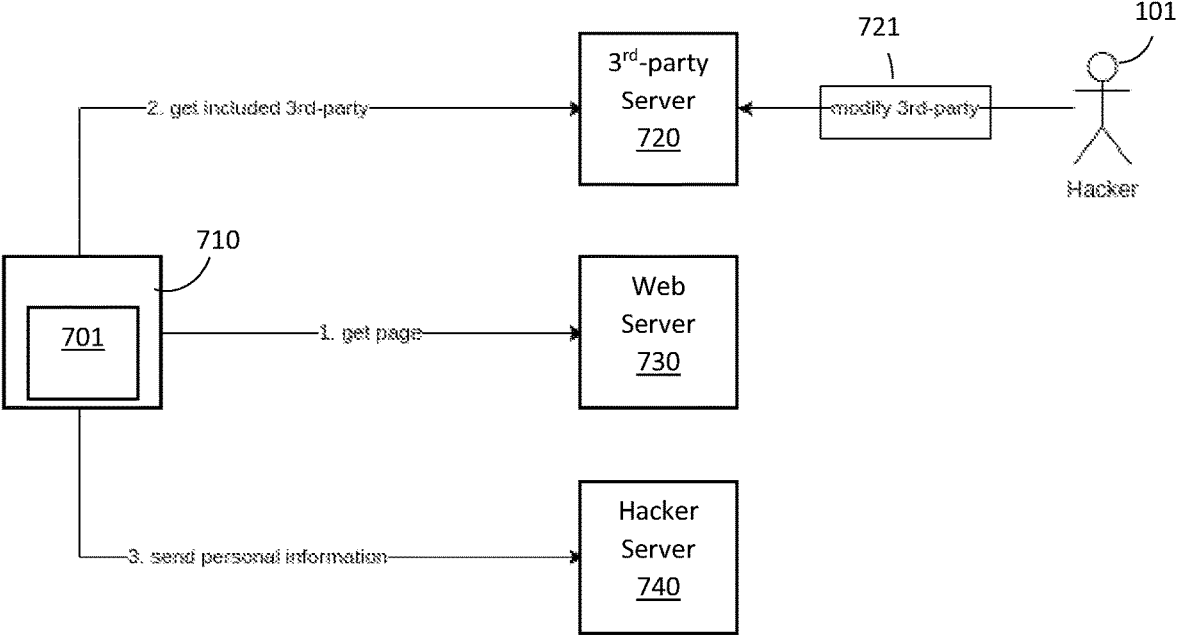
FIG. 7 is a schematic diagram illustrating the operatives of client-side cross-site scripting exploitation attacks.

FIG. 6 is an example block diagram of a hardware architecture 600 of a defense server 120. In embodiment, the client device 110 and the reverse proxy 160 are realized using the hardware architecture 600.

The hardware architecture 600 includes a processing circuitry 610 coupled to a memory 620, a storage 630, and a network interface 640. In an embodiment, the components of the client device (or simply "client") 110 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing unit (GPUs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or any combination thereof. In one configuration, computer readable instructions needed to implement one or more embodiments disclosed herein may be stored in the storage 630.

In another embodiment, the memory 620 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by one or more processors, cause the processing circuitry 610 to perform the various processes described herein. Specifically, the instructions, when executed, cause the processing circuitry 610 to generate identity key(s) by executing the script code as discussed above. In a further embodiment, the memory 620 may further include a memory portion 625 including the instructions.

The storage 630 may be magnetic storage, optical storage, and the like, and may be realized, for example, as flash memory or other memory technology, CD-ROM, Digital Versatile Disks (DVDs), hard-drives, solid-state drive (SSD), or any other medium which can be used to store the desired information, such as log of transactions, public keys, and so on. The storage 630 may include the various access policies and games.

It should be understood that the embodiments described herein are not limited to the specific architecture illustrated in FIG. 6, and that other architectures may be equally used without departing from the scope of the disclosed embodiments.

It should be further noted that the client device 110 and the reverse proxy 160 may be realized using a computing architecture similar to the architecture illustrated in FIG. 6, but that other architectures may be equally used without departing from the scope of the disclosed embodiments. Further, the memory 620 may include instructions for executing the function of the respective device, e.g., a client device 110 or the reverse proxy 160.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner.

Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting client-side cross-site scripting exploitation attacks, comprising:
    downloading, by a client-side defense agent of a web browser that is executing on a client device, an access list from a remote server;
    capturing, by the client-side defense agent, a request to access an external web resource, wherein the request is initiated by a script being executed by the web browser, wherein the external web resource is external to the web browser; and
    when it is determined by the client-side defense agent, based on the access list, that the requested external web resource cannot be accessed, applying, by the client-side defense agent, a mitigation action on the request to access the external web resource.

2. The method of claim 1, further comprising:
    relaying the request to the external web resource when it is determined that the external web resource can be accessed.

3. The method of claim 1, wherein the request to access the external web resource is an application programming interface (API) call sent by the script.

4. The method of claim 3, further comprising:
    hardening scripts embedded in a webpage rendered by the web browser to allow capturing API calls generated by the script.

5. The method of claim 3, further comprising:
    injecting a service worker into the web browser, wherein the service worker is configured to capture API calls by scripts embedded in a webpage.

6. The method of claim 3, wherein the script includes any piece code executed or activated by the script executed on a web page.

7. The method of claim 1, further comprising:
    injecting, by a reverse proxy, to the web browser the defense agent in response to the request to access a protected web server.

8. The method of claim 1, wherein the access list includes a whitelist listing legitimate web resources hosted by a protected web server.

9. The method of claim 1, wherein applying a mitigation action further comprises:
    blocking the access to the external web resource.

11

10. A non-transitory computer readable medium having stored thereon instructions for causing a processing circuitry of a client-side defense agent of a web browser that is executing on a client device to execute a process, the process comprising:

downloading, by the client-side defense agent of the web browser that is executing on the client device, an access list from a remote server;

capturing, by the client-side defense agent, a request to access an external web resource, wherein the request is initiated by a script being executed by the web browser, wherein the external web resource is external to the web browser; and when it is determined by the client-side defense agent, based on the access list, that the requested external web resource cannot be accessed, applying, by the client-side defense agent, a mitigation action on the request to access the external web resource.

11. A system for detecting client-side cross-site scripting exploitation attacks, the system implementing a client-side defense agent of a web browser that is executing on a client device, the system comprising:

a processing circuitry; and a memory, the memory containing instructions that, when executed by the processing circuitry, configure the system to:

download into the client-side defense agent an access list from a remote server;

capture, by the client-side defense agent, a request to access an external web resource, wherein the request is initiated by a script being executed by the web browser, wherein the external web resource is external to the web browser; and

when it is determined, by the client-side defense agent, based on the access list, that the requested external web resource cannot be accessed, apply a mitigation action on the request to access the external web resource when it is determined that the external web resource cannot be accessed.

12. The system of claim 11, wherein the system is further configured to:

relaying the request to the external web resource when it is determined that the external web resource can be accessed.

13. The system of claim 11, wherein the request to access the external web resource is an application programming interface (API) call sent by the script.

14. The system of claim 13, wherein the system is further configured to:

harden scripts embedded in a webpage rendered by the web browser to allow capturing API calls generated by script.

15. The system of claim 13, wherein the system is further configured to:

inject a service worker into the web browser, wherein the service worker is configured to capture API calls by scripts embedded in a webpage.

16. The system of claim 13, wherein the script includes any piece code executed or activated by the script executed on a web page.

17. The system of claim 11, wherein the access list includes a whitelist listing legitimate web resources hosted by a protected web server.

18. The system of claim 11, wherein to apply the mitigation action the system is further configured to:

block the access to the external web resource.

* * * * *